United States Patent [19]

Kaminski

[11] 4,126,727
[45] Nov. 21, 1978

[54] RESINOUS POLYMER SHEET MATERIALS HAVING SELECTIVE, DECORATIVE EFFECTS

[75] Inventor: Stanley J. Kaminski, Trenton, N.J.

[73] Assignee: Congoleum Corporation, Kearny, N.J.

[21] Appl. No.: 696,594

[22] Filed: Jun. 16, 1976

[51] Int. Cl.² .................. B32B 3/30; B32B 31/22; B05D 7/00

[52] U.S. Cl. ................... 428/172; 101/32; 156/79; 156/277; 156/279; 264/51; 264/131; 264/132; 427/214; 427/262; 427/265; 427/373; 356/164; 428/144; 428/159; 428/204; 428/208; 428/212; 428/320; 428/324; 428/330; 428/336; 428/339; 428/363; 428/403

[58] Field of Search ............... 428/158–160, 428/172, 168, 143, 144, 187, 204, 207, 208, 913, 918, 330, 320, 324, 325, 322, 326, 327, 328, 363, 402–407, 336, 212, 338, 220, 339; 156/79, 219–221, 277, 278, 279; 264/DIG. 82, 131, 132, 134, 293, 321, 51; 101/32; 350/164, 166, 106, 105; 427/214, 261, 162, 262, 265, 373, 197, 198, 203, 205

[56] References Cited

U.S. PATENT DOCUMENTS

| 3,345,234 | 10/1967 | Jecker et al. | 428/160 |
|---|---|---|---|
| 3,437,515 | 4/1969 | Quinn et al. | 428/432 |
| 3,562,076 | 2/1971 | Lea | 428/331 |
| 3,660,187 | 5/1972 | Shortway et al. | 156/79 |
| 3,741,851 | 6/1973 | Erb et al. | 156/220 |

OTHER PUBLICATIONS

McCrone et al., Techniques, Instruments and Accessories for Microanalysts, First Edition, Walter C. McCrone Associates 1974.
Chamot et al., "Handbook of Chemical Microscopy" vol. I, Second Edition, John Wiley & Sons, Inc. New York 1938.

*Primary Examiner*—Stanley S. Silverman
*Attorney, Agent, or Firm*—Richard T. Laughlin

[57] ABSTRACT

Resinous polymer sheet materials having selective, decorative effects comprising: a first layer of a resinous polymer composition; a pattern or design printed on and adhered to the surface of the first layer of resinous polymer composition and having a relatively dark colored printed portions and relatively light colored printed portions; and a second layer of a resinous polymer composition applied on and adhered to the printed pattern or design and to the first layer of resinous polymer composition, the second layer of resinous polymer composition having a refractive index of from about 1.3 to about 1.7 and having included or embedded substantially uniformly therein a layer of relatively small, flat, decorative chips or flakes comprising a very thin layer of translucent or transparent platelets provided with a coating having a refractive index of at least about 1.8 and at least 0.2 greater than the refractive index of any surrounding, contacting material, and a thickness of from about 0.05 micron to about 2 microns, such that light wave interference and color absorptive effects are created in light waves striking and reflecting from the second layer of resinous polymer composition, whereby those decorative chips or flakes located over the relatively dark colored printed portions are discernible from eye-level or a distance of about five feet, whereas those decorative chips or flakes located over the relatively light colored printed portions are indiscernible from eye-level or a distance of about five feet. Methods of making such resinous polymer sheet materials having such selective, decorative effects are also included.

26 Claims, 3 Drawing Figures

U.S. Patent  Nov. 21, 1978  4,126,727
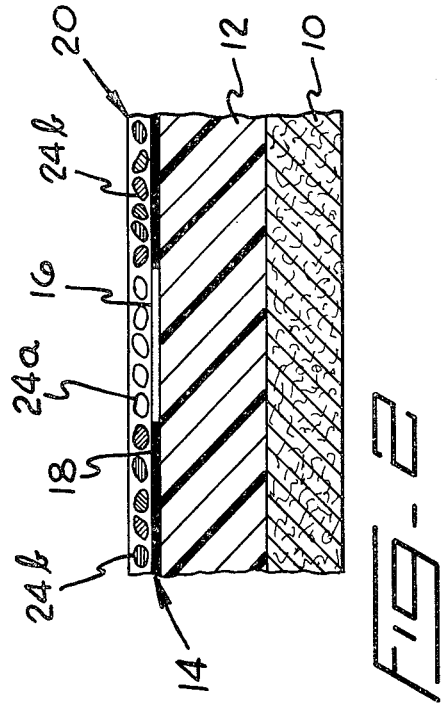
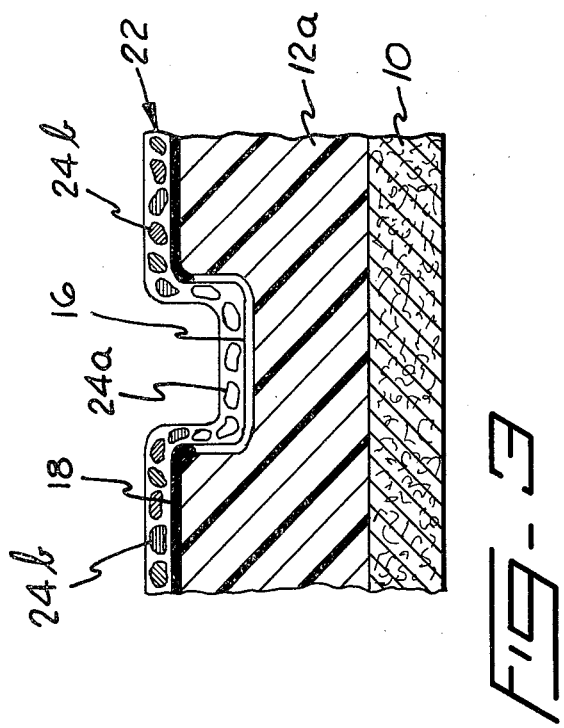

RESINOUS POLYMER SHEET MATERIALS HAVING SELECTIVE, DECORATIVE EFFECTS

THE FIELD OF THE PRESENT INVENTION

The present invention relates to decorative sheet materials, and more particularly to decorative sheet materials of use as floor, wall, and ceiling coverings; desk, table, and counter tops; surface layers on leather, fabrics, paper, wood, metals, glass, etc; upholstery, drapery, and clothing materials; interiors for cars, trucks, boats, airplanes, and other means of transportation; covers for books and other publications; and like articles. Even more particularly, the present invention is concerned with such decorative sheet materials having an embossed or textured surface.

THE GENERAL BACKGROUND OF THE PRESENT INVENTION

Decorative sheet materials have been manufactured for many years and one of the commonest means of enhancing the decorative effect has been to incorporate various, relatively small eye-catching particles, chips, or flakes in the decorative sheet materials to provide additional surface interest. One example of such techniques is noted in U.S. Pat. No. 3,660,187 which issued on May 2, 1972 and which describes processes of incorporating small decorative chips or flakes of various colors and hues in the wear layer of a resilient floor covering.

These relatively small decorative chips or flakes of various hues and colors are included and are present substantially uniformly in the wear layer and are substantially uniformly visible or discernible by persons viewing the resilient floor covering. When pattern or design is provided in the resilient floor covering, the relatively small decorative chips or flakes of various colors and hues are visible and discernible in substantially all parts of the pattern or design. And, if the resilient floor covering is of the embossed type, whether chemically embossed, mechanically embossed, or otherwise, the relatively small decorative chips or flakes are visible and discernible in both the raised portions and the depressed portions of the resilient embossed floor covering.

This substantially uniform appearance of the eye-catching, relatively small decorative particles, chips, or flakes is normally not undesirable or objectionable but sometimes there are occasions when it is desired that the decorative particles, chips, or flakes be limited or confined to certain selected portions of the pattern or design, or to certain raised or depressed portions, if an embossed or textured type of resilient floor covering is involved. This is rather difficult to accomplish, inasmuch as the easiest and most economical way to include the decorative chips or particles in the product is simply to incorporate them in the formulation of the wear layer where they become substantially uniformly dispersed during the mixing of the formulation which is subsequently applied to the main portion of the resilient floor covering. To do otherwise has introduced manufacturing difficulties and has increased operating and production costs.

For example, if a simulated brick or ceramic tile and surrounding mortar or grout pattern or design were to be involved, and it was desired that the simulated brick or ceramic tile be raised or elevated above the adjacent, surrounding lower or depressed simulated mortar or grout, and that only the simulated brick or the ceramic tile possess the eye-catching decorative appearance, it was equally desired that the adjacent, surrounding depressed or lower simulated mortar or grout not possess an eye-catching, decorative appearance but that it merely have the typical dull, neutral, natural gray, white or light color usually associated with such cementitious materials. Such, of course, would provide for a more desirable contrasting appearance between the simulated brick or ceramic tile and the surrounding simulated mortar or grout.

PURPOSES AND OBJECTS OF THE PRESENT INVENTION

It is therefor a principal purpose and object of the present invention to provide improved methods whereby the relatively small, eye-catching decorative particles, chips or flakes of various colors and hues may be incorporated substantially uniformly in the wear layer during its formulation and mixing but wherein such relatively small, eye-catching decorative particles, chips or flakes are discernible or visible only in those portions where it is desired that they be discernible or visible and that they be indiscernible or invisible in those other portions where they appearance is not desired or required.

BRIEF SUMMARY OF THE PRESENT INVENTION

It has been found that such principal purpose and object, as well as other principal purposes and objects which will become clearer from a further reading and better understanding of this disclosure, may be accomplished by providing resinous sheet materials having selective, decorative effects in selected portions thereof which comprise: a first layer of a resinous polymer composition; a pattern or design printed on and adhered to the surface of the first layer of resinous polymer composition and having relatively dark colored printed portions and relatively light colored printed portions; and a second layer of a resinous polymer composition applied on and adhered to the printed pattern or design and to the first layer of resinous polymer composition, the second layer of resinous polymer composition having a refractive index of from about 1.3 to about 1.7 and having included or embedded substantially uniformly therein a layer of relatively small, flat, decorative chips or flakes comprising a very thin layer of translucent or transparent platelets provided with a coating having a refractive index of at least about 1.8 and at least about 0.2 greater than the refractive index of any surrounding, contacting material, and a thickness of from about 0.05 micron to about 2 microns, such that light wave interference effects and color absorptive effects are created in the light waves incident upon and reflecting from the second layer of resinous polymer composition, whereby those decorative chips or flakes located over the relatively dark colored printed portions are discernible from eye-level or a distance of about five feet, whereas those decorative chips or flakes located over the relatively light colored printed portions are indiscernible from eye-level or a distance of about five feet. Methods of making such resinous polymer sheet materials having such selective, decorative effects in selected portions thereof are also included.

BRIEF DESCRIPTION OF THE DRAWINGS

In the following specification and accompanying self-explanatory drawings, there are described and illustrated typical and preferred embodiments of the present inventive concept but it is to realized that the present invention in its broader aspects is not to be construed as limited to such typical or preferred embodiments as are specifically disclosed but to include other equivalent embodiments, as determined by the spirit and the scope of the appended claims.

Referring to the accompanying self-explanatory drawings,

FIG. 1 is a simplified, diagrammatic flow chart of a typical embodiment of the process of the present invention;

FIG. 2 is a fragmentary cross-sectional view of a typical intermediate product of the process of the present invention; and FIG. 3 is a fragmentary cross-sectional view of a typical final product of the process of the present invention.

FIGS. 2 and 3 have not been drawn precisely to exact scale. Some portions thereof have been drawn to a slightly larger scale, whereas certain other portions thereof have been drawn to a slightly smaller scale. This has been done primarily to being out more clearly the details of the smaller portions and to accentuate some of the more important features of the present invention.

DESCRIPTION OF THE PREFERRED EMBODIMENT

THE BACKING SHEET MATERIAL

A relatively flat, backing sheet material 10 is employed as a base or substrate for the products of the present invention and normally comprises a felted or matted fibrous sheet; a non-woven, woven, knitted, or otherwise constructed fabric; a resinous composition; a paper product; or like sheet materials. A fibrous sheet material comprising inorganic fibers, such as asbestos, or organic fibers, such as cellulose, or synthetic or man-made fibers and/or filaments is one of the most popular backing sheet materials but many others are suitable and utilizable and are set forth in the previously cited U.S. Patent and in the U.S. Patents to be cited hereinafter.

The thickness of the backing sheet material 10 will depend to a large measure upon the particular product to be made and the particular subsequent use for which it is intended. Normally, such thickness is in the range of from about 10 mils to about 60 mils but other thicknesses may be used in particular special circumstances.

A size coat, such as an aqueous emulsion or latex of a suitable resin, such as a acrylic resin or a polyvinyl chloride polymer or copolymer, may be applied to the surface of the backing sheet material 10, if desired or required, primarily to decrease the porosity and latent absorbency of the backing sheet material 10, particularly if it happens to be a relatively open structure, such as a loosely woven fabric. The size coating serves to prevent any coating materials subsequently deposited thereon from penetrating and soaking into the backing sheet material to an undesired extent.

THE FOAMABLE RESINOUS POLYMER COMPOSITION

A foamable resinous polymer composition 12 is prepared by well-known conventional methods and may contain: a synthetic resin, such as a polymer or a copolymer of vinyl chloride; a blowing or foaming agent, such as azodicarbonamide; various accelerators or catalysts, such as dibasic lead phosphate to accelerate the decomposition of the blowing or foaming agent, to reduce the decomposition temperature, or to narrow the decomposition temperature range; stabilizers to reduce the harmful effects of degradation due to light, heat, etc.; plasticizers such as butyl benzoyl phthalate; pigments such as titanium dioxide; solvents such as dodecyl benzene and methyl ethyl ketone; and other conventional and well-known additives.

Although a polymer or a copolymer of vinyl chloride is the preferred synthetic resin to be incorporaed in the foamable resinous polymer composition 12, many other synthetic resins are equally utilizable. Many of these other suitable synthetic resins are set forth in the previously mentioned U.S. Patent, as well as in other U.S. Pat. Nos. 3,293,094 and 3,293,108 which issued Dec. 20, 1966 to R. F. Nairn et al.

Also, although azodicarbonamide is indicated as the preferred blowing or foaming agent, many other equivalent blowing and foaming agents are also applicable to the principles of the present invention. Many of these other blowing and foaming agents ae set forth in the United States Patents cited herein and reference thereto is incorporated herein.

In a similar way, many other accelerators, catalysts, viscosity modifiers, light and heat stabilizers, UV absorbers, plasticizers, pigments, antioxidants, bacteriostats and bacteriocides, and other additives may be included in the resinous polymer composition.

The specific nature and the particular physical and chemical characteristics and properties of the various constituents of the resinous polymer composition 12 do not relate to the essence or the critical features of the present invention and further specific elaboration is not believed necessary. All of these constituents are well-known and conventional in the industry and many are specifically set forth in the United States Patents mentioned herein.

The foamable resinous polymer composition 12 is poured on or cast upon, or is otherwise applied to the surface of the backing sheet material 10 substantially uniformly by procedures well known in the industry. The thickness of the coating of resinous polymer composition 12, as cast and still wet, is in the range of from about 5 mils to about 50 mils, or even more, if so desired or required.

After the resinous polymer composition 12 has been applied to the surface of the backing sheet material 10, it is then heated in an oven or other suitable heating apparatus for a period of time of from about 1 minute to about 4 minutes at an elevated temperature of from about 240° F. to about 450° F., whereby it gels and becomes firm. The temperature and time relationships are interdependent and the higher the temperature, the shorter the time, and vice versa. The elevated temperature, however, is not sufficiently high enough as to activate or to decompose any blowing or foaming agent, if one is present in the resinous polymer composition 12, as to cause blowing or foaming at this time.

THE PRINTING OF THE GELLED RESINOUS POLYMER COMPOSITION

After the resinous polymer composition 12 has been heated to a sufficiently elevated temperature for the required period of time and has gelled and firmed without being blown or foamed, it is cooled and is then printed or coated with a suitable printing ink composition 14 in a suitable pattern or design. This is illustrated in FIGS. 2 and 3 for purposes of describing the present invention, as comprising a pattern or design simply having a white or relatively light colored printed portion 16 and a black or relatively dark colored printed portion 18 located on each side of the centrally located portion 16.

Either of these printed portions 16 or 18 may contain a blow modifier to affect the subsequent blowing or foaming of the resinous polymer composition 12, or both printed portions 16 and 18 may contain blow modifiers in different amounts, concentrations, or types, or, if no blowing or foaming is desired or required, then neither of the printed portions 16 or 18 has a blow modifier therein. In the present case, a blow modifier, such as an inhibitor or a suppressant, is used in the central white or light colored printed portion 16 but there is no inhibitor or suppressant in the outer black or relatively dark colored printed portions 18, 18.

Typical well-known and conventional printing ink compositions are to be noted in the United States Patents cited herein and further specific elaboration thereof is not believed necessary or required.

COLOR

With reference to the descriptive terms "white" color and "black" color printed portions, it is believed that such terms are self-explanatory and clear. However, with reference to the terms "relatively light" color and "relatively dark" color printed portions, it is believed that some additional explanation will be helpful in more easily understanding the present invention. Colors are described as differing in hue, brightness or brilliance or luminosity, purity or saturation, or, more popularly as very light, light, medium, dark, very dark, and other intermediate or additional terms. These descriptive terms are defined in great particularity in the color charts and the accompanying explanatory notes and tables in the colored, four-page insert between pages 540–541 of Webster's New International Dictionary (Second Edition), 1934, and are used herein with such materials as a frame of reference. An additional explanation and clarification of these terms from a differnt viewpoint is found in Webster's Third New International Dictionary, 1966, page 448 and the colored, two-page insert between pages 448–449.

Also, as further clarification, pastel colors, for example, are viewed as light or very light colors, being pale and of low or medium-low saturation and of medium high to high brightness. As used herein, the term "hue" is the property of a color which depends upon its frequency; "saturation" depends upon the amount of the colored light present, the less colored light present, the less saturated the color is used to be; and "brightness" is the degree of resemblance to white which may be said to possess maximum brightness, of the difference from black which may be said to possess zero brightness. Light or very light colors therefor have medium-high or high brightness. Black or dark colors have medium-low or low to zero brightness. The present invention will be described by more specific reference to printing ink compositions and patterns and designs having white and black printed portions, inasmuch as such terms are more clearly and easily understood. Additionally, such white and black printed portions provide for an excellent illustration of the basic principles of the present inventive concept. However, this is not intended to limit the applicability of the broader aspects of the principles of the present invention strictly to white and black printed portions but to include relatively light colored printed portions and relatively dark colored printed portions, as defined and as illustrated in the dictionary references.

After the gelled, foamable resinous polymer composition 12 has been printed with the printing ink composition 14, it is dried and is then ready for the application thereto of a pre-formed, relatively thin, flat, translucent or transparent sheet material 20 which, ultimately, after further processing, will become the outer wear layer 22, as shown in FIG. 3.

THE PREPARATION OF THE PRE-FORMED SHEET MATERIAL

The pre-formed, relatively thin, flat, translucent or transparent sheet material 20 is formulated from a synthetic, thermoplastic, resinous polymer composition, preferably again containing: a polymer or a copolymer of vinyl chloride, to which is added well-known and conventional agents such as certain fillers, plasticizers, light and heat stabilizers, UV absorbers, antioxidants, solvents, etc.

These constituents are generally similar to the constitutents described previously with respect to the foamable resinous polymer composition 12, except that blowing agents or opaque materials are not included in the formulation so that it is translucent or transparent. Thus far, the formulation is conventional and should require no further specific elaboration as to the constituents mentioned. The thickness of the pre-formed sheet material 20 is in the range of from about 10 mils to about 60 mils.

The following is a partial list of suitable synthetic polymer compositions and their indices of refraction applicable to the principles of the present invention: polyvinyl chloride (1.54); polyvinyl acetate (1.47); vinyl chloride-vinylidene chloride (85-15) (1.55); vinyl chloride-vinylidene chloride (15–85) (1.61); ethyl celluose (1.47); polymethyl methacrylate (1.49); polyethylene, low density, branched (1.51); etc.

In addition to the above-mentioned conventional constituents, there is also included in the formulation, relatively small, flat, very thin platelets which are coated with a material having a refractive index of at least about 1.8, and preferably greater than 2.5, and at least 0.2 greater than the refractive index of any surrounding, contacting material.

THE COATED PLATELETS

Although, as will be pointed out hereinafter, other coated platelets are suitable for the purposes of the present invention, the preferred coated platelet is a titanium dioxide-coated mica platelet. This is actually a very smooth-surfaced, very thin, flat mica lamellae having adhered thereto or fused or calcined thereon a very uniform, very thin coating of crystalline titanium dioxide.

Methods of making such titanium dioxide-coated mica platelets, and more specific details as to their physical and chemical properties and characteristics are noted in the prior art such as in U.S. Pat. Nos. 3,087,827, 3,087,828, 3,418,146, and 3,437,515 and reference thereto is incorporated herein.

When the titanium dioxide crystals are supported on a mica platelet as a suitable substrate, the size of such mica support platelet, that is, the length and width dimensions, is in the range of from about 2 microns to about 100 microns, and preferably from about 5 microns to about 50 microns, with reference to the diameter or the longest dimension of the preponderance by number of the mica support platelets. The thickness of such mica support platelets is in the range of from about 0.05 micron to about 9 microns and preferably from about 0.1 micron to about 4 microns. The ratio of the diameter or the maximum length or width dimension to the thickness dimension is at least about 4:1.

Mica is a member of a relatively large group of water insoluble, mineral silicates of varying chemical composition but with generally similar properties and atomic structures. They are usually quite hard with Mons'scale hardness scale values in excess of 2.5; have relatively high indices of refraction in the range of 1.5 to 1.6; and may be found in colorless, translucent or transparent forms. They all have excellent cleavage properties and can readily be split into very thin, flexible, elastic sheets or platelets.

It is not essential that mica be employed as the support or substrate for the titanium dioxide. Other water-insoluble supports and other substrates may be used, provided they possess the desired dimensions and the necessary physical and chemical properties and characeristics for the specific purpose and use in mind for the product. Examples of such other supports and substrates include: glass platelets; ceramics and plastics; lacquers especially cellulose esters and ethers such as cellulose acetate, cellulose nitrate, ethyl cellulose, and methyl cellulose; varnishes; resinous substances including polyester resins, epoxy resins, acrylate resins, amino resins, etc., inorganic compounds such as calcium sulfate anhydrites, etc., all of these having indices of refraction within the range of from about 1.3 to about 1.7, and preferably between about 1.5 and 1.6. Methods of preparing such other supports and substrates in the required dimensions and thicknesses are described in U.S. Pat. Nos. 3,861,946, 3,437,515 and other patents cited herein.

It is also not essential that the titanium dioxide exist as a coating on a mica or other support or substrate. It may exist in unsupported form and be used as such. Methods of making such unsupported forms of titanium dioxide are disclosed in U.S. Pat. No. 3,861,946.

In any event, regardless of whether it is supported or not supported on a substrate, the titanium dioxide is in the form of a layer or film having a geometric thickness of from less than about 0.05 micron to as much as about 2 microns, and preferably from about 0.1 micron to about 1 micron. Its optical thickness (refractive index multiplied by the geometric thickness in millimicrons) is in the range of from about 170 to about 3600, and preferably from about 190 to about 1500, and most desirably from about 200 to about 360, whereby yellow, red, blue, green and other colorations are obtainable.

The titanium dioxide is actually in crystalline form, having an individual crystal size of as small as about 0.05 micron, with reference to its longest dimension. The individual crystals are thus so small that they do not scatter light and therefore behave optically as a continuous layer or film of extreme thinness. More precisely speaking, there are two layers of films of titanium dioxide, one on each side of the flat supporting substrate, when one is used, the supporting substrate in most cases not contributing optically in any material way to the reflection or interference or absorption phenomenon of the coated platelet.

Although titanium dioxide is the preferred coating material for the production of the desired selective, decorative effects, it is to be appreciated that many other water insoluble materials are suitable for specific uses and circumstances. Such other materials include metallic oxides of zirconium, cerium, vanadium, molybdenum, tungsten, etc., or mixtures thereof, and other materials which are available in the required dimensions and thicknesses such as natural pearl essence, guaine, basic lead carbonate, bismuth oxychloride, lead hydrogen arsenate, lead hydrogen phosphate, zinc sulfide, etc. All of these materials have indices of refraction in excess of about 1.8 and preferably in excess of about 2.5 and, when used in supported form, are deposited on supports or substrates having considerably lower indices of refraction of less than about 1.7 and down to about 1.3, but with a difference in index of refraction of at least about 0.2 or more from the index of refraction of the coated layer or film. When these materials are used in unsupported form, greater care must be exercised in their handling, due to their relatively decreased resistance to fragmentation and their decreased ability to withstand the shear forces encountered in industrial processing.

THE DECORATIVE CHIP OR FLAKE FORMULATION

The titanium dioxide-coated mica or other platelets are blended into a formulation containing a resin, such as a polymer or copolymer of vinyl chloride and added conventional agents including a filler, such as platy talc; a plasticizer, such as dioctyl phthalate; a UV light absorbent; stabilizers; antioxidants; viscosity modifiers; etc. The general ranges of the major constituents of such a formulation containing the titanium dioxide-coated mica or other platelets are:

From about 35% to about 65% of the polymer or copolymer;
from about 10% to about 35% of a suitable plasticizer;
from about 15% to about 35% of a suitable filler; and
from about 1% to about 30% of the desired platelets.
(all percentages are by weight)

Other ranges are possible for special circumstances. The other constituents of the formulation, such as the stabilizers, UV absorbents, antioxidants, viscosity modifiers, etc. are present in relatively minor amounts of from about 0.1% to about 7% by weight.

THE FORMATION OF THE DECORATIVE CHIP OR FLAKE

The decorative chip or flake formulation containing the titanium dioxide-coated mica or other platelets is first formed into a sel-sustaining or self-supporting, translucent or transparent sheet material, such as by an extrusion or calendering or other process. The thickness of the sheet material is in the range of from about 1 mil to about 50 mils, and preferably in the range of from about 3 mils to about 15 mils. Other thickness are useful for special uses and circumstances.

The resinous polymer sheet material containing the titanium dioxide-coated mica platelets is then granulated into relatively flat chips or flakes having the desired dimensions and size. Depending upon the desired colored or multicolored effects in the ultimate product, the thickness of the chips or flakes is in the range of from about 1 mil to about 50 mils, and preferably from about 3 mils to about 15 mils, with the length and width dimensions depending upon the degree of the granulation and normally being in the range of from about 1/64 inch to about ½ inch. These relatively flat chips or flakes are now ready for inclusion in the formulation of the wear layer composition.

THE FORMATION OF THE WEAR LAYER

The relatively flat chips or flakes are blended into the previously described synthetic, thermoplastic resinous polymer wear layer composition in proportions of from about 35% to about 75% by weight of the relatively flat chips or flakes to about 65% to about 25% by weight of the synthetic, thermoplastic resinous polymer wear layer composition. The complete formulation is thoroughly mixed and is formed into the pre-formed, self-sustaining or self-supporting, translucent or transparent sheet material 20 by an extrusion or calendering process at elevated controlled temperatures. This preformed sheet material is now ready for application to the gelled, printed foamable resinous polymer composition 12.

THE LAMINATION PROCESS

The pre-formed sheet material 20 is then placed on top of the gelled, printed foamable resinous polymer composition 12 and is adhered thereto by a conventional heat and pressure calendering process at controlled elevated temperatures and under desired laminating pressures. Such laminating procedures are well known in the industry and particularly in the resilient flooring art and are well described in the U.S. Pat. No. 3,660,187 previously cited. Further description of specific details of such procedures is not deemed to be necessary.

THE EMBOSSING PROCEDURES

The multi-layered assembly comprising the backing sheet material 10, the foamable resinous polymer composition 12, the printing ink composition 14 comprising the dark portions 18 and the light portions 16 with the blow modifier present therein in the desired portions, which, in the case of FIGS. 2 and 3 is the central light portion 16, and the translucent or transparent sheet material layer 20 is then heated to an elevated temperature sufficient to fuse both the foamable resinous polymer composition 12 and the translucent or transparent sheet material layer 20 and to decompose and activate the blowing or foaming agent in the foamable resinous polymer composition 12 to institute the blowing or foaming action. The temperature of the entire mass must reach the fusion temperature of the resins in order to obtain a product of maximum strength. Using the preferred vinyl chloride polymer or co-polymer, fusion is attained at a temperature of from about 325° F. to about 375° F.

The embossed or textured configuration of the foamed resinous polymer composition 12a with its higher areas and its lower areas and the embossed or textured configuration of the wear layer 22 in the finished product, as illustrated in FIG. 3, is to be particularly observed. The three-dimensional embossed or textured effect is excellent.

THE PRODUCT OF THE PRESENT INVENTION

After being cooled to room temperature, the product is observed as having an unusual an unexpected appearance, in addition to the three dimensional embossed or textured effect. The chips or flakes 24b which are located in the wear layer 22 over the dark colored printed portions 18 create an excellent multi-colored, nacreous effect which is very clearly visible and discernible from eye-level or from a distance of about five feet, which distance is selected as a criterio inasmuch as that distance is approximately about the eye-level height of an adult standing on the final product when it is being used as a resilient floor covering and is being viewed by such an adult.

However, the multi-colored nacreous effect is discernible only in those areas of the product wherein the foamable resinous polymer composition 12 was printed with the dark colored printing ink composition 18. In such areas, the decorative colored chips or flakes are discernible and visible and the multi-colored narcreous effect is excellent. However, in those areas of the product wherein the foamable resinous polymer composition 12 was printed with the light printing ink composition 16, the chips or flakes 24a are indiscernible and there is no multi-colored nacreous effect.

Consequently, in FIG. 3, the higher portions or lands of the product show the desired multi-colored nacreous appearance, whereas the lower portions or mortars of the product do not show the multi-colored nacreous effect and merely have a relatively pure white or a light color, or grayish color. This, of course, is highly desired where the multi-colored nacreous effect is to be limited to the brick or simulated tile surfaces or lands, thus leaving the surrounding adjacent lower areas or mortars in an excellent simulation of cement, grout, or other cementitious material.

It is not known for certain or beyond any possible doubt the precise reasons for such a selective decorative effect. However, theories have been advanced to account for it. These theories are set forth herewith as possible or probable explanations.

One theory is based on the light interference phenomenon observed in wave motion concept relations involving the wave intensity of light. It has been established that, when two trains of waves, such as light waves which are transverse wave motions, have the same wave length and the same amplitude of vibration and are traveling in the same direction and are superposed, the two trains of waves do not always reinforce or strengthen each other to produce increased illumination. Sometimes, they will actually neutralize, cancel, or destroy each other and no illumination at all will be in evidence, if the two trains of waves are out-of-phase by a half-a-wave length or a multiple thereof, or completely out-of-phase. This is often referred to as destructive interference of light.

It is therefore conceivable and quite possible that the multi-colored effects in the light waves emanating or reflecting from that portion of the product which has the white or light colored printed portions 16 are neutralizing or cancelling each other and are becoming indiscernible and invisible. And, at the same time, the multi-colored effects in the light waves emanating or reflecting from that portion of the product which has the black or the dark colored printed portions 18 are reinforcing and strengthening each other and are becoming more discernible and more visible.

The light interference theory is completely compatible with and does not conflict with the related light absorption theory which is based on the fact that the color of most objects is due to selective absorption and that all colored transparent substances owe their color to the fact that they selectively absorb certain parts of the white light passing therethrough. Similarly, and more specifically, when white light falls upon an opaque surface, such as a white or light colored printed portion or a black or dark colored printed portion, some of the white light is transmitted and passes into the opaque surface and is absorbed therein. On the other hand, certain other specific frequencies of the white light are diffusely reflected close to the surface. Absorption would therefore to be taking place over the white or light colored printed portions but not over the black or dark colored printed portions of the foamed resinous polymer composition 12a.

Also to be considered is the theory that, when white light strikes the surface of the titanium dioxide-coated mica or other platelet, one colored component of the white color is reflected outwardly, whereas another colored component, which is the complementary color to the relected color, is transmitted inwardly through to the opaque printed ink portions therebeneath.

If that opaque printed ink surface is white or a light color, then the complementary color is reflected outwardly and returns to rejoin the initially reflected color to produce therewith the original white light which is not too readily discernible or visible.

However, if the opaque printed ink surface is black or a dark color, the complementary color is not reflected outwardly but is absorbed by the black or dark colored printed portion, whereby the originally reflected color is not neutralized and is discernible or visible as the relected color.

More specifically, if the reflection characteristics are blue, green, yellow and red, then the transmission characteristics are yellow, red, blue and green, respectively, which if reflected by the white or light colored printed portions, will serve to neutralize or cancel the reflection characteristics.

The present invention will be further described with particular reference to the following specific Examples, wherein there are disclosed typical and preferred embodiments of the present invention. However, it is to be pointed out that such specific Examples are primarily illustrative of the present invention and are not to be construed as limitative of the broader aspects of the present inventive concept, except as defined and limited by the scope of the appended claims.

EXAMPLE I

This Example illustrates the preparation of a typical wear resistant, embossed resilient floor covering sheet material having selective decorative effects in selected areas, exemplary of the products of the present inventive concept.

An 0.035 inch thick fibrous asbestos sheet backing material is coated substantially uniformly to a wet thickness depth of about 0.015 inch with the following foamable resinous polymer composition:

|  | Parts |
|---|---|
| Polyvinyl chloride (low molecular weight) | 50 |
| Polyvinyl chloride (high molecular weight) | 50 |
| Dibasic lead phosphate | 1.5 |
| Azodicarbonamide | 2.5 |
| Titanium dioxide | 5 |
| Butyl benzoyl phthalate | 55 |
| Dodecyl benzene | 10 |

Gelling and firming of the foamable resinous polymer composition is accomplished by heating for a period of time of about 2½ minutes in an oven maintained at an elevated temperature of about 400° F.

The following white colored printing ink composition is applied to selected portions of the surface of the gelled, firmed resinous polymer composition by means of rotogravure printing techniques:

|  | Parts |
|---|---|
| Fumaric acid | 10 |
| Vinyl chloride - vinyl acetate co-polymer | 7.5 |
| Methyl ethyl ketone | 47.5 |
| Titanium dioxide | 14 |

Other portions of the surface of the gelled, firmed resinous polymer composition are similarly printed by means of rotogravure printing techniques with the following black colored printing ink composition:

|  | Parts |
|---|---|
| Vinyl chloride - vinyl acetate co-polymer | 7.5 |
| Methyl ethyl ketone | 47.5 |
| Lamp black base | 14 |

The overall pattern or design is that of a simulated ceramic tile surface of squares and rectangles, wherein the black colored printed portions represent the simulated ceramic tile and the white colored printed portions represent the mortar or grout between the simulated ceramic tiles.

Three separate resinous polymer formulations are prepared containing the normal conventional constituents suitable for inclusion in a typical wear layer formulation, such as noted in U.S. Pat. No. 3,293,108, but with each of the separate formulations containing a different type of titanium dioxide-coated mica platelet therein, which differ from each other primarily by the thickness of the titanium dioxide coating or layer thereon. The three separate formulations are as follows:

|  | Red | Gold | Blue |
|---|---|---|---|
|  | Parts | Parts | Parts |
| Polyvinyl chloride | 100 | 100 | 100 |
| Platy talc | 50 | 50 | 50 |
| Dioctyl phthalate | 32.5 | 32.5 | 32.5 |
| Butyl benzoyl phthalate | 4.5 | 4.5 | 4.5 |
| Stabilizer | 7.5 | 7.5 | 7.5 |
| U.V. light stabilizer | 0.4 | 0.4 | 0.4 |
| Flamenco Red 100 (Mearl) | 4.0 | — | — |
| Flamenco Gold 100 (Mearl) | — | 4.0 | — |
| Flamenco Blue 100 (Mearl) | — | — | 4.0 |

The Flamenco constituents are pearlescent nacreous products or pigments manufactured by Mearl Corporation and are composed of very thin platelets of mica coated with very thin coatings or layers of titanium dioxide. The particle size average range is from about 10 to about 35 microns, with an overall range of all particles in the range of from about 2 to about 100 microns, with reference to the longest dimension of most platelets. The refractive index of the polyvinyl chloride is 1.54. The refrctive index of the mica is 1.5–1.6 and the refractive index of the titanium dioxide is 2.5–2.6. There are three thickness to the titanium dioxide layer, producing red, gold and blue in each of the formulations. The heat and light stability is excellent.

The three formulations are separately formed into three relatively flat, translucent or transparent, self-sustaining or self-supporting sheets of about 15 mils thicknesses by an extruding process.

The sheets are then comminuted into chips or flakes of approximately ⅛ inch in maximum dimension and are intermingled. These chips or flakes are then uniformly blended into the following resinous polymer formulation in the proportions of about 50% by weight of chips or flakes and 50% by weight of the following resinous polymer formulation:

|  | Parts |
| --- | --- |
| Dispersion grade polyvinyl polyvinyl resin | 320 |
| Dioctyl phthalate | 99 |
| Polyvinyl chloride and dioctyl phthalate plastisol | 48 |
| Stabilizer | 19.2 |
| Butyl benzoyl phthalate | 16 |
| Stearic acid | 1.3 |

The blend, while at a temperature of about 70° F., is fed to two chrome-plated calender rolls. The top roll is heated to an elevated temperature of about 290° F. and the bottom roll is heated to an elevated temperature of about 270° F.. The calender rolls are spaced apart by a distance as to provide a nip to produce a sheet material of about 0.030 inch thickness. This is the pre-formed, translucent or transparent, self-supporting or self-sustaining sheet material to ultimately become the wear layer. It possesses a generally milky, translucent appearance. The pre-formed self-supporting, translucent sheet material is then laminated to the surface of the printed, gelled foamable resinous polymer composition. This is done by passing both sheets to a laminator at a speed of about 30 feet per minute, such that the printed ink surface of the foamable resinous polymer composition is in very intimate, face-to-face contact with the pre-formed layer. A uniform thoroughly adhered laminated product is obtained having a uniform, relatively flat, smooth-surfaced outer layer.

The resulting laminate is then passed, at a speed of about 30 feet per minute, through a heated oven having four zones each of about 30 feet in length. The heated zones are maintained at elevated temperatures of about 300° F., 300° F., 405° F., and 400° F., respectively. During the heating operation, the laminate becomes fused and the blowing agent is activated and decomposed to form elevated cellular portions on the surface of the resinous product. The final product has an embossed or textured appearance with the ratio of foam thickness to original unfoamed thickness being about 3:1, the elevated or raised areas being located over the black colored printed portions which do not contain any blow modifier. On the other hand, the areas which are raised less and appear to be relatively depressed with respect to the raised or elevated areas are those positioned over the white colored printed portions which do contain a blow modifier.

Additionally, the raised portions located over the black colored printed portions are speckled and possess a multi-colored, nacreous appearance and present an excellent decorative simulated ceramic tile appearance. But, the depressed portions surrounding the raised areas are not speckled and do not possess a multi-colored, nacreous appearance. They are still basically white or light colored in their appearance and resemble very well the dull, neutral color of mortar or grout. The decorative chips or flakes are discernible or visible in the black colored simulated ceramic tile portions but are not discernible or visible in the white colored simulated mortar or grout portions, as viewed from eye-level or a distance of about five feet.

EXAMPLE II

The procedures set forth in Example I are followed substantially as described therein with the exception that the amounts of the Flamenco constituents are increased from 4.0 parts to 8.0 parts. The results of Example II are generally comparable to the results of Example I, except that the multi-colored, nacreous effect is more pronounced in the simulated ceramic tile portions located over the black colored printed portions.

EXAMPLE III

The procedures set forth in Example I are followed substantially as described therein with the exception that the white and black colored portions of the printed pattern or design are replaced with another pattern or design employing the very light colors of white, pale pastel yellow and pale pastel pink and the very dark colors of black, violet and navy blue. A blow suppressant is included in the white or light colored portions. No blow suppressant is included in the black or dark colored portions.

After blowing and finishing operations, the raised portions over the black or dark colored printed portions have the desired multi-colored nacreous effects, whereas the lower portions over the white or light colored printed portions do not have the multi-colored nacreous effects, as viewed from eye-level or from a distance of about five feet.

EXAMPLE IV

The procedures set forth in Example I are followed substantially as described therein with the exception that the titanium dioxide is replaced by zirconium dioxide having a refractive index of 2.1–2.2. The results of this Example are generally similar to the results of Example I and the products are generally comparable.

EXAMPLE V

The procedures set forth in Example I are followed substantially as described therein with the exception that the mica platelet support is replaced by a calcium sulfate anhydrite support. Titanium dioxide is used as the coating thereon. The refractive index of the calcium sulfate anhydrites is in the range of 1.5–1.6. The results of this Example are generally similar to the results of Example I and the products are generally comparable. The multi-colored nacreous effect is excellent.

As used herein, the term "layer" of platelets or "layer" of chips or flakes is not to be considered as limited to a configuration wherein all the individual platelets, or the individual chips or flakes, are arranged in equally spaced and geometrically aligned positions in a single stratum or a single plane. FIGS. 2 and 3 show such a configuration but such is for illustrative purposes and is not to be construed as limitative of the present invention. The platelets, as well as the chips or flakes in which they are embedded, are more or less generally oriented parallel to the surface of the resinous polymer in which they are disposed, but are not equally spaced, are not in geometrically aligned positions, and may exist in more than one strata or plane. The best that can be said for such a configuration is that it is substantially uniform.

The net effect of all the platelets embedded in all the chips or flakes, however, is that of a layer or bed of platelets in which all the platelets within a particular chip or flake have the same thickness of coating and therefore the same nacreous coloration but in which the platelets differ from one another in that the thicknesses of their coatings differ, whereby the multi-colored effects are obtained.

Although several specific Examples of the inventive concept have been described in particularly, the same should not be considered as limiting the invention to the specific materials and procedures mentioned therein but to include various other materials and procedures, as well as other equivalent features, as set forth in the claims appended hereto. It is understood that any suitable changes modifications, and variations may be made without departing from the scope and the spirit of the broader aspects of the present invention.

What is claimed is:

1. Resinous polymer sheet material having selective, decorative, multi-colored nacreous effects in selected portions thereof comprising: a first layer of a resinous polymer composition; a pattern or design printed on the surface of said first layer of resinous polymer composition and having relatively dark colored printed portions and relatively light colored printed portions; a second layer of a resinous polymer composition applied over and adhered to said printed pattern or design, said second layer of resinous polymer composition having a refractive index of from about 1.3 to about 1.7; and translucent or transparent decorative chips or flakes substantially uniformly dispersed throughout said second layer of resinous polymer composition, said translucent or transparent decorative chips or flakes comprising translucent or transparent platelets having a refractive index of from about 1.3 to about 1.7 and provided with a translucent or transparent coating having a refractive index of at least about 1.8 and a thickness of from about 0.05 micron to about 2 microns, whereby destructive interference or other optical effects are created such that said translucent or transparent decorative chips or flakes located over said relatively dark colored printed portions of said pattern or design are given multi-colored nacreous effects which are discernible from a distance of about five feet, whereas said translucent or transparent decorative chips or flakes located over said relatively light colored printed portions are indiscernible from a distance of about five feet.

2. A resinous polymer sheet material as defined in claim 1, wherein said coating has a refractive index of at least about 2.5.

3. A resinous polymer sheet material as defined in claim 1, wherein said coating has a thickness of from about about 0.1 micron to about 1 micron.

4. A resinous polymer sheet material as defined in claim 1, wherein said coating comprises titanium dioxide.

5. A resinous polymer sheet material as defined in claim 1, wherein said coating comprises zirconium dioxide.

6. A resinous polymer sheet material as defined in claim 1, wherein said translucent or transparent platelets have a refractive index of from about 1.3 to about 1.7 but more than about 0.2 less than the refractive index of said coating.

7. A resinous polymer sheet material as defined in claim 1, wherein said translucent or transparent platelets have a refractive index of from about 1.5 to about 1.6.

8. A resinous polymer sheet material as defined in claim 1, wherein said translucent or transparent platelets are mica.

9. A resinous polymer sheet material as defined in claim 1, wherein said translucent or transparent platelets are calcium sulfate anhydrites.

10. A resinous polymer sheet material as defined in claim 1, wherein said translucent or transparent platelets have a maximum dimension in the range of from about 2 microns to about 100 microns.

11. A resinous polymer sheet material as defined in claim 1, wherein said translucent or transparent platelets have a maximum dimension in the range of from about 5 microns to about 50 microns.

12. A resinous polymer sheet material as defined in claim 1, wherein said translucent or transparent platelets have a maximum dimension to thickness ratio of at least about 4 to 1.

13. A resinous polymer sheet material as defined in claim 1, wherein relatively dark colored printed portions are black.

14. A resinous polymer sheet material as defined in claim 1, wherein said relatively light colored printed portions are white.

15. A resinous polymer sheet material as defined in claim 1, wherein said first layer of resinous polymer composition contains a polymer of polyvinyl chloride.

16. A resinous polymer sheet material as defined in claim 1, wherein said first layer of resinous polymer composition is a foamed resinous polymer composition.

17. A resinous polymer sheet material as defined in claim 1, wherein said second layer of resinous polymer composition is embossed and possesses raised portions and depressed portions.

18. A resinous polymer sheet material as defined in claim 1, wherein said second layer of resinous polymer composition is embossed and possesses raised portions which coincide with said relatively dark colored printed portions and depressed portions which coincide with said relatively light colored printed portions.

19. A resinous polymer sheet material as defined in claim 18, wherein raised portions exhibit multicolored decorative effects.

20. A resinous polymer sheet material as defined in claim 1, wherein it is in form of a resilient floor covering.

21. A method of making a resinous polymer sheet material having selective decorative multi-colored nacreous effects in selected portions thereof comprising: forming a first layer of a resinous polymer composition; printing a pattern or design on the surface of said first layer of resinous polymer composition having relatively dark colored printed portions and relatively light colored printed portions; forming a second layer of a resinous polymer composition having a refractive index of from about 1.3 to about 1.7 and having substantially uniformly dispersed therein translucent or transparent decorative chips or flakes comprising translucent or transparent platelets having a refractive index of from about 1.3 to about 1.7 and a translucent or transparent coating thereon having a refractive index of at least about 1.8 and a thickness of from about 0.05 micron to about 2 microns; and applying said second layer of resinous polymer composition adheringly over said printed pattern or design, whereby destructive interference or other optical effects are created such that said translucent or transparent chips or flakes located over said relatively dark colored printed portions of said pattern or design are given multi-colored nacreous effects which are discernible from a distance of about five feet, whereas said translucent or transparent chips or flakes located over said relatively light colored printed portions of said printed pattern or design are indiscernible form a distance of about five feet.

22. A method as defined in claim 21, wherein said first layer of resinous polymer composition contains a blowing agent which, upon being heated to a sufficiently elevated temperature for a required period of time, will decompose to create a foamed resinous polymer sheet material.

23. A method as defined in claim 22, wherein a blow modifier is included in one of said colored printed portions, whereby the extent of the blowing or foaming in said first layer of resinous polymer composition in contact with said colored printed portion is modified.

24. A method as defined in claim 22, wherein a blow modifier is included in said relatively light colored printed portion, whereby the extent of the blowing or foaming in said first layer of resinous polymer composition in contact with said light colored printed portion is modified.

25. A resinous polymer sheet material as defined in claim 1, wherein said translucent or transparent coating comprises titanium dioxide in crystalline form having an individual crystal size of as small as about 0.05 micron, with reference to its longest dimension, whereby it does not scatter light.

26. A resinous polymer sheet material as defined in claim 1 wherein said translucent or transparent platelets are very smooth-surfaced, very thin and flat lamellae.

* * * * *